(No Model.)

F. O. BROWN.
APPARATUS FOR BORING ARTESIAN WELLS.

No. 472,493. Patented Apr. 5, 1892.

WITNESSES
Chas. E. Riordon.

INVENTOR
Frank O. Brown
By W. S. Boyd, his Attorney

UNITED STATES PATENT OFFICE.

FRANK O. BROWN, OF DALLAS, TEXAS.

APPARATUS FOR BORING ARTESIAN WELLS.

SPECIFICATION forming part of Letters Patent No. 472,493, dated April 5, 1892.

Application filed November 28, 1891. Serial No. 413,367. (No model.)

*To all whom it may concern:*

Be it known that I, FRANK O. BROWN, a citizen of the United States, residing at Dallas, in the county of Dallas and State of Texas, have invented certain new and useful Improvements in Apparatus for Boring Artesian Wells; and I do hereby declare the following to be a full, clear, and exact description of the invention, such as will enable others skilled in the art to which it appertains to make and use the same.

My invention relates to an apparatus for boring Artesian wells, and has for its object to furnish a combination-tool which will wear or cut the harder grades of rock frequently met with in boring wells of this class, and also to furnish a tool which will be harder than the common steel tool or auger, thereby dispensing with the necessity of taking out and sharpening or beating it out, as must be so frequently done with a steel tool, which is a tedious and costly operation.

With these ends in view my invention consists in the novel combination and arrangement of parts of such a tool, as will be hereinafter more particularly set forth.

Figure 3:
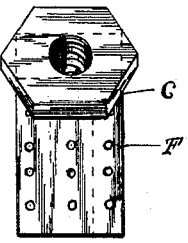
Figure 2:
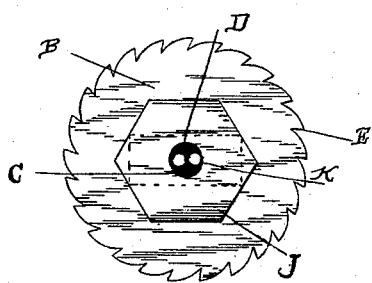
Figure 1:
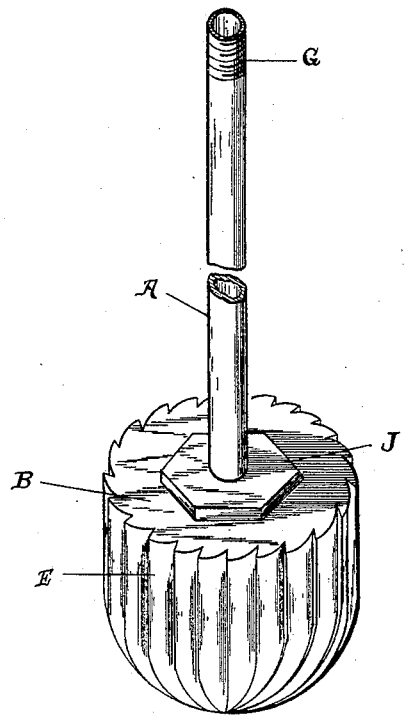
Figure 4:
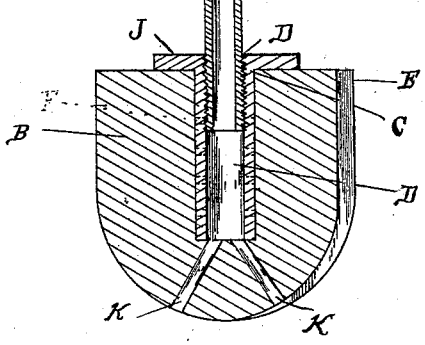

Referring to the accompanying drawings, in which the same letters of reference indicate corresponding parts in each of the views, Figure 1 is a view of a drill-rod and tool attached ready for use. Fig. 2 is a top view of the tool without the rod. Fig. 3 is a view of the metal socket which forms a part of the fluted hemispherical cutting-tool, as shown in Fig. 1, and is embedded in it; and Fig. 4 is a longitudinal sectional view of the tool and the lower end of the rod or shaft for operating it.

In the drawings, A indicates the drill rod or bar, threaded at its lower end to engage the socket C of the tool, which is provided with female threads to receive the end of the rod A. The upper end of the bar is threaded in the usual manner, as shown at G, to attach it to the bars above it and by means of which power is communicated to the the tool from the motor at the top of the well.

B is a fluted corundum hemispherical mass in which is embedded the metal socket C. The mass or cutting-tool B is formed in any suitable manner, as by compression with any suitable binding material, and can be made in any suitable design, one of which is shown in the drawings, in which the sides are provided with fluted ribs or edges, as shown at E. The edges of the ribs may be made as sharp or angular as desired, so as to present as sharp cutting portions as possible which will expedite the work, and the channels between the ribs will afford ample means by which the tool can clear itself as it advances and will also afford means for the passage of water up around the drill when water is used in connection with the drill. When it is desirable to use water, the bar or shaft A is preferably made hollow, and the corundum mass B is provided with one or more holes K, which extend from the lower portion of the socket C to the periphery of the mass, two such holes being shown in Fig. 4. In this manner the water is delivered as near the point of the tool as possible, and in passing up at the sides of the tool through the channels the chips or borings of the rock are carried up with it and thence out at the top of the well. When water is not used, the borings will drop to the bottom of the well when the tool is removed and can be removed by the ordinary sand-pump.

The socket C, which is tapped and threaded, as at D, is also provided with projections or depressions F, with which the corundum engages when it is being molded around it and is thus more securely fastened to the socket. The top part of the socket is formed or provided with a nut-like portion J, by which it may be securely fastened to the drill rod or shaft, and may be of any suitable form to be engaged with a wrench.

In operation the tool is fastened to the lower end of the drill rod or shaft and a rotary motion imparted to it by any of the well-known means for such work. As the well is sunk or bored, additional lengths of shaft are added until the well is completed. From time to time the drill is raised up out of the well and the borings removed by any suitable means, as by the sand-pump. However, if it is desired to use the tool in connection with hydraulic apparatus for forcing water down to the bottom of the well the casing may be utilized, or, more preferably, the shaft or drill-rod may be made hollow and the mass of corundum provided with suitable passages for directing the water to the point of the drill, from whence it will find its way up the sides of the drill through the flutes or channels.

I am aware that changes in form and proportion of parts and details of construction of the mechanism herein shown and described as an embodiment of my invention can be made without departing from the spirit of or sacrificing the advantages of my invention. I therefore reserve the right to make such modifications as fairly fall within the scope of my invention.

Having thus described my invention, what I claim as new, and desire to secure by Letters Patent, is—

1. In combination, a fluted hemispherical mass of corundum for boring Artesian wells, said mass being provided with cutting-edges which extend from the apex to the base, a metallic core embedded within the mass, and means for attaching it to a drill-rod, substantially as described.

2. In combination, a socket the lower portion of which is provided with transverse holes and the upper portion of which is provided with means for securing it to a drill-rod for boring Artesian wells, and a mass of corundum secured to the lower portion of the socket, the sides of the mass being fluted and provided with sharp cutting-edges, substantially as described.

3. In combination, a flat socket provided at its upper portion with a nut and tapped and screw-threaded, a mass of corundum secured to the flat portion below the nut, the sides of which are fluted and provided with sharp cutting-edges, and means for securing it to the lower end of a drill-rod for boring Artesian wells, substantially as described.

4. In combination, a socket provided with a vertical opening, a mass of corundum secured thereto, having one or more perforations leading from the bottom of the vertical opening in the socket to the point of the mass, said mass having its sides fluted and provided with sharp cutting-edges, and a hollow drill-rod with its lower end in the socket and its upper end adapted to receive a rotary motion, and a stream of water, substantially as described.

In testimony whereof I affix my signature in presence of two witnesses.

FRANK O. BROWN.

Witnesses:
   FRED. H. BROWN,
   CHAS. J. STERER.